L. D. FRENOT.
NUT LOCK.
APPLICATION FILED JAN. 28, 1909. RENEWED MAR. 29, 1910.

957,504.

Patented May 10, 1910.

Witnesses

Inventor
Louis D. Frenot
By
Attorney

UNITED STATES PATENT OFFICE.

LOUIS D. FRENOT, OF NEWARK, NEW JERSEY.

NUT-LOCK.

957,504.  Specification of Letters Patent.  Patented May 10, 1910.

Application filed January 28, 1909, Serial No. 474,692. Renewed March 29, 1910. Serial No. 552,236.

*To all whom it may concern:*

Be it known that I, LOUIS D. FRENOT, a citizen of the United States, residing at Newark, in the State of New Jersey, have invented certain new and useful Improvements in Nut-Locks, of which the following is a full and exact specification.

This invention relates to certain new and useful improvements in nut locks of the general type disclosed in the Patent No. 752,507, granted to me February 16, 1904, and it has for its object to improve thereupon, and to reduce the number of parts, combining the washer with the spring tongues and also giving the washer such a shape that it will have an extended flat bearing on the fish plate.

Figure 1:
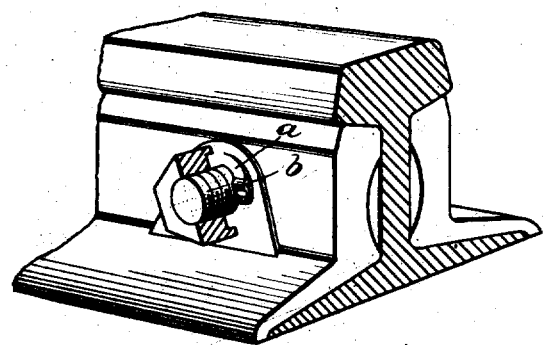
Figure 2:
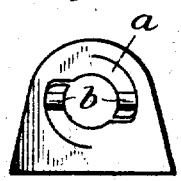
Figure 3:
Figure 4:
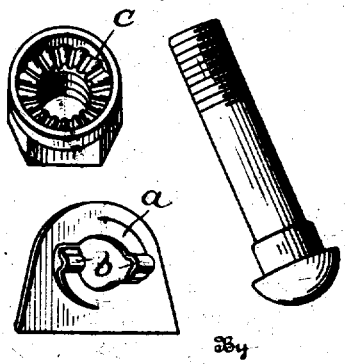

In the accompanying drawings, Figure 1 is a perspective view of the new nut lock as applied to a rail and fish plates, the nut being shown in section. Fig. 2 is a face view of the washer. Fig. 3 is an edge view thereof. Fig. 4 shows the parts necessary for producing a safe locking, said parts being now reduced to the bolt, the nut and the washer.

Like reference characters indicate like parts throughout the several views.

I stamp out of the washer resilient tongues $a$ with rounded enlargements $b$ and adapted to engage the corrugations $c$ on the face of the cup-shaped nut. It is evident that the rounded enlargements of the washer, which are stamped out of its plane on one side only in one operation, will coöperate with the corrugations of the nut, that is to say, the nut can be screwed home and will be prevented from turning loose while, by the application of a wrench, the nut can be unscrewed without injury to the parts. The washer has an extended flat bottom face adapted to have an extended flat bearing on the flange of the rail, or in the fish plate, as seen in Fig. 1, whereby it is held against turning.

Having thus described my invention, what I claim is:—

In a nut-lock, the combination of a bolt, a washer having opposite projecting yielding tongues on one face thereof, provided with rounded enlargements on the ends thereof and an extended flat bottom face forming an extended bearing to prevent turning of the washer, and a cup-shaped nut receiving said tongues, said nut having corrugations to engage said enlargements, substantially as described.

In testimony whereof I affix my signature.

LOUIS D. FRENOT.

In the presence of—
HENRY POMEREHNE,
FRANK A. BOETTNER.

---

It is hereby certified that in Letters Patent No. 957,504, granted May 10, 1910, upon the application of Louis D. Frenot, of Newark, New Jersey, for an improvement in "Nut-Locks," an error appears in the printed specification requiring correction as follows: Line 10, the Patent number "752,507" should read *752,057;* and that the said Letters Patent should be read with this correction therein that the same may conform to the record of the case in the Patent Office.

Signed and sealed this 21st day of June, A. D., 1910.

[SEAL.]

F. A. TENNANT,
*Acting Commissioner of Patents.*

UNITED STATES PATENT OFFICE.

LOUIS D. FRENOT, OF NEWARK, NEW JERSEY.

NUT-LOCK.

957,504. Specification of Letters Patent. Patented May 10, 1910.

Application filed January 28, 1909, Serial No. 474,692. Renewed March 29, 1910. Serial No. 552,236.

*To all whom it may concern:*

Be it known that I, LOUIS D. FRENOT, a citizen of the United States, residing at Newark, in the State of New Jersey, have invented certain new and useful Improvements in Nut-Locks, of which the following is a full and exact specification.

This invention relates to certain new and useful improvements in nut locks of the general type disclosed in the Patent No. 752,507, granted to me February 16, 1904, and it has for its object to improve thereupon, and to reduce the number of parts, combining the washer with the spring tongues and also giving the washer such a shape that it will have an extended flat bearing on the fish plate.

In the accompanying drawings, Figure 1 is a perspective view of the new nut lock as applied to a rail and fish plates, the nut being shown in section. Fig. 2 is a face view of the washer. Fig. 3 is an edge view thereof. Fig. 4 shows the parts necessary for producing a safe locking, said parts being now reduced to the bolt, the nut and the washer.

Like reference characters indicate like parts throughout the several views.

I stamp out of the washer resilient tongues $a$ with rounded enlargements $b$ and adapted to engage the corrugations $c$ on the face of the cup-shaped nut. It is evident that the rounded enlargements of the washer, which are stamped out of its plane on one side only in one operation, will coöperate with the corrugations of the nut, that is to say, the nut can be screwed home and will be prevented from turning loose while, by the application of a wrench, the nut can be unscrewed without injury to the parts. The washer has an extended flat bottom face adapted to have an extended flat bearing on the flange of the rail, or in the fish plate, as seen in Fig. 1, whereby it is held against turning.

Having thus described my invention, what I claim is:—

In a nut-lock, the combination of a bolt, a washer having opposite projecting yielding tongues on one face thereof, provided with rounded enlargements on the ends thereof and an extended flat bottom face forming an extended bearing to prevent turning of the washer, and a cup-shaped nut receiving said tongues, said nut having corrugations to engage said enlargements, substantially as described.

In testimony whereof I affix my signature.

LOUIS D. FRENOT.

In the presence of—
HENRY POMEREHNE,
FRANK A. BOETTNER.

---

Correction in Letters Patent No. 957,504.

It is hereby certified that in Letters Patent No. 957,504, granted May 10, 1910, upon the application of Louis D. Frenot, of Newark, New Jersey, for an improvement in "Nut-Locks," an error appears in the printed specification requiring correction as follows: Line 10, the Patent number "752,507" should read *752,057;* and that the said Letters Patent should be read with this correction therein that the same may conform to the record of the case in the Patent Office.

Signed and sealed this 21st day of June, A. D., 1910.

[SEAL.]

F. A. TENNANT,
*Acting Commissioner of Patents.*

Correction in Letters Patent No. 957,504.

It is hereby certified that in Letters Patent No. 957,504, granted May 10, 1910, upon the application of Louis D. Frenot, of Newark, New Jersey, for an improvement in "Nut-Locks," an error appears in the printed specification requiring correction as follows: Line 10, the Patent number "752,507" should read *752,057;* and that the said Letters Patent should be read with this correction therein that the same may conform to the record of the case in the Patent Office.

Signed and sealed this 21st day of June, A. D., 1910.

[SEAL.]

F. A. TENNANT,

*Acting Commissioner of Patents.*